US 9,217,429 B2

(12) United States Patent
Hu et al.

(10) Patent No.: US 9,217,429 B2
(45) Date of Patent: Dec. 22, 2015

(54) LINEAR COMPRESSOR

(75) Inventors: Jin Seok Hu, Masan-si (KR); Shin Hyun Park, Busan (KR); Yong Tae Kim, Gimhae-si (KR); Hoon Bong Lee, Changwon-si (KR); Kye Lyong Kang, Gyeongsangnam-do (KR)

(73) Assignee: LG ELECTRONICS INC., Seoul (KR)

( * ) Notice: Subject to any disclaimer, the term of this patent is extended or adjusted under 35 U.S.C. 154(b) by 531 days.

(21) Appl. No.: 13/561,435

(22) Filed: Jul. 30, 2012

(65) Prior Publication Data
US 2013/0004335 A1    Jan. 3, 2013

Related U.S. Application Data

(63) Continuation-in-part of application No. 13/509,074, filed as application No. PCT/KR2010/008161 on Nov. 18, 2010, now abandoned.

(30) Foreign Application Priority Data

Nov. 18, 2009    (KR) .................. 10-2009-0111586

(51) Int. Cl.
*F04B 17/04*    (2006.01)
*F04B 49/06*    (2006.01)
(Continued)

(52) U.S. Cl.
CPC ................ *F04B 49/06* (2013.01); *F04B 35/04* (2013.01); *F04B 35/045* (2013.01); *F04B 39/06* (2013.01); *H02P 25/027* (2013.01); *F04B 2203/0401* (2013.01); *F04B 2203/0402* (2013.01)

(58) Field of Classification Search
CPC ........ F04B 35/045; F04B 39/06; F04B 49/06; F04B 49/065; F04B 17/03; F04B 17/04; F04B 35/04; F04B 2203/0401; F04B 2203/0402; H02P 25/06; H02P 25/027; H02P 27/04; H02P 25/08
See application file for complete search history.

(56) References Cited

U.S. PATENT DOCUMENTS 5,658,132 A * 8/1997 Akazawa ............. B60H 1/3222
                                                                       318/803
5,980,211 A   11/1999 Tojo et al.
(Continued)

FOREIGN PATENT DOCUMENTS

DE    10 2006 009 231    8/2007
EP          1 635 060       3/2006
(Continued)

OTHER PUBLICATIONS

European Search Report dated Mar. 3, 2014.
International Search Report dated Aug. 25, 2011 issued in Application No. PCT/KR2010/008161.

*Primary Examiner* — Bryan Lettman
(74) *Attorney, Agent, or Firm* — Ked & Associates LLP

(57) ABSTRACT

A linear compressor which can perform the natural cooling capacity modulation, even if a capacitor connected to a motor is removed. The linear compressor includes a fixed member having a compression space therein, a movable member linearly reciprocated in the fixed member to compress a refrigerant sucked into the compression space, and one or more springs provided to elastically support the movable member in the motion direction of the movable member. The compressor also includes a motor connected to the movable member to linearly reciprocate the movable member in the axial direction, and a motor control unit performing the cooling capacity modulation by the reciprocation of the movable member according to a load, by controlling an AC voltage applied to the motor so that a stroke of the movable member can be proportional to the magnitude of the AC voltage applied to the motor.

13 Claims, 5 Drawing Sheets

(51) Int. Cl.
*F04B 35/04* (2006.01)
*H02P 25/02* (2006.01)
*F04B 39/06* (2006.01)

(56) References Cited

U.S. PATENT DOCUMENTS 6,537,034 B2 * 3/2003 Park et al. .................. 417/44.1

8,057,190 B2 11/2011 Reinschke

FOREIGN PATENT DOCUMENTS

| | | | |
|---|---|---|---|
| JP | 2001-090659 | A | 4/2001 |
| KR | 10-0764277 | B1 | 10/2007 |
| KR | 10-0801373 | B1 | 2/2008 |
| KR | 10-0845943 | B1 | 7/2008 |
| KR | 20100008307 | * | 1/2010 .............. F04B 35/04 |

* cited by examiner

LINEAR COMPRESSOR

CROSS-REFERENCE TO RELATED APPLICATIONS

This application is a Continuation-In-Part Application of prior U.S. patent application Ser. No. 13/509,074 filed May 10, 2012, which claims priority to International Application No. PCT/KR2010/008161 filed Nov. 18, 2010, which claims priority to Korean Application No. 10-2009-0111586 filed on Nov. 18, 2009, whose entire disclosures are hereby incorporated by reference.

TECHNICAL FIELD

The present invention relates to a linear compressor, and, more particularly, to a linear compressor which can perform the natural cooling capacity modulation, even if a capacitor connected to a motor is removed.

BACKGROUND ART

In general, a motor is provided in a compressor which is a mechanical apparatus for receiving power from a power generation apparatus, such as an electric motor, a turbine, etc. and compressing the air, refrigerant or other various operating gases to raise a pressure. The motor has been widely used in electric home appliances such as refrigerators, air conditioners, etc., and its application has been expanded to the whole industry.

Specifically, the compressors are roughly classified into a reciprocating compressor in which a compression space for sucking and discharging an operating gas is defined between a piston and a cylinder so that the piston can be linearly reciprocated in the cylinder to compress a refrigerant, a rotary compressor in which a compression space for sucking and discharging an operating gas is defined between an eccentrically-rotated roller and a cylinder so that the roller can be eccentrically rotated along the inner wall of the cylinder to compress a refrigerant, and a scroll compressor in which a compression space for sucking and discharging an operating gas is defined between an orbiting scroll and a fixed scroll so that the orbiting scroll can be rotated along the fixed scroll to compress a refrigerant.

Recently, a linear compressor which not only improves a compression efficiency but also has a simple structure has been actively developed among the reciprocating compressors. In particular, the linear compressor does not have a mechanical loss caused by a motion conversion since a piston is directly connected to a linearly-reciprocating driving motor.

FIG. 1 is a block diagram of a motor control device used in a conventional linear compressor.

As illustrated in FIG. 1, the motor control device includes a rectification unit having a diode bridge 11 receiving, rectifying and outputting AC power which is commercial power and a capacitor C1 smoothing the rectified voltage, an inverter unit 12 receiving a DC voltage, converting the DC voltage to an AC voltage according to a control signal from a control unit 17, and supplying the AC voltage to a motor unit, the motor unit having a motor 13 and a capacitor C2 connected in series to the motor 13, a voltage sensing unit 14 sensing a both-end voltage of the capacitor C1, a current sensing unit 15 sensing a current flowing through the motor unit, an operation unit 16 operating a counter electromotive force (EMF) from the voltage sensed by the voltage sensing unit 14 and the current sensed by the current sensing unit 15, and the control unit 17 generating a control signal by reflecting the counter EMF from the operation unit 16 and the current sensed by the current sensing unit 15.

In the conventional linear compressor shown in FIG. 1, additional costs and space are needed because the capacitor C2 connected in series to the motor 13 is provided in the linear compressor. In addition, although the cooling capacity modulation characteristics based on the load are determined by the capacity of the capacitor C2, in the prior art, it is not easy to change the capacity of the capacitor C2. Moreover, the preparation and selective connection of a plurality of capacitors cause difficulties in terms of cost, space, and design.

FIG. 2 is a graph showing changes of a stroke and an input voltage of the motor of FIG. 1. In the conventional linear compressor, if the capacitor C2 is removed in a simple manner, as shown in FIG. 2, a phenomenon in which a voltage applied to the motor is reduced, i.e., a jump phenomenon occurs near the top dead center (TDC), so that the cooling capacity modulation (under stroke operation) is impossible. In the graph of FIG. 2, the closer to 0.00, the closer to the TDC.

DISCLOSURE

Technical Problem

An object of the present invention is to provide a linear compressor which can control the cooling capacity modulation, even if a capacitor connected to a motor of the linear compressor is removed.

Another object of the present invention is to provide a linear compressor which can control a natural cooling capacity modulation rate according to a load capacity.

A further object of the present invention is to provide a linear compressor which can prevent a stroke jump phenomenon during its control operation.

Technical Solution

According to an aspect of the present invention, there is provided a linear compressor including: a fixed member having a compression space therein; a movable member linearly reciprocated in the fixed member to compress a refrigerant sucked into the compression space; one or more springs provided to elastically support the movable member in the motion direction of the movable member; a motor connected to the movable member to linearly reciprocate the movable member in the axial direction; and a motor control unit performing the cooling capacity modulation by the reciprocation of the movable member according to a load, by controlling an AC voltage applied to the motor so that a stroke of the movable member can be proportional to the magnitude of the AC voltage applied to the motor.

In addition, the stroke of the movable member may be proportional to the magnitude of the AC voltage applied to the motor at least in close proximity to the top dead center of the movable member.

Moreover, the motor control unit may include an attenuation operation unit attenuating an inductance effect of a coil of the motor by using a current flowing through the motor.

Additionally, the motor control unit may include a rectification unit receiving AC power and outputting a DC voltage, an inverter unit receiving the DC voltage, converting the DC voltage to an AC voltage according to a control signal, and supplying the AC voltage to the motor, a current sensing unit sensing a current flowing between the motor and the inverter unit, and a control unit integrating the current from the current sensing unit, operating an attenuation voltage by multiplying the integrated value by a constant (1/Cr), generating a control signal for producing an AC voltage corresponding to a difference between the set voltage and the attenuation voltage, and applying the control signal to the inverter unit.

Further, the constant (1/Cr) may be variable.

Furthermore, the cooling capacity modulation rate of the compressor may be changed by the variation of the constant (1/Cr).

According to another aspect of the present invention, there is provided a method for controlling a linear compressor which includes a fixed member having a compression space therein, a movable member provided in the fixed member to compress a refrigerant sucked into the compression space, one or more springs provided to elastically support the movable member, and a motor connected to the movable member to linearly reciprocate the movable member in the axial direction, the method including: a first step of applying a preset initial voltage to the motor; a second step of calculating a first attenuation voltage with a current produced by the application of the preset initial voltage; a third step of calculating a first required voltage corresponding to a difference between the initial voltage and the attenuation voltage; a fourth step of applying the calculated required voltage to the motor; a fifth step of calculating a second attenuation voltage with a current produced by the application of the calculated required voltage; a sixth step of calculating a second required voltage corresponding to a difference between the initial voltage and the second attenuation voltage; and a seventh step of applying the second required voltage to the motor.

According to a further aspect of the present invention, there is provided a motor control device of a linear compressor including: a rectification unit receiving AC power and outputting a DC voltage; an inverter unit receiving the DC voltage, converting the DC voltage to an AC voltage according to a control signal, and supplying the AC voltage to a motor; the motor driven by the AC voltage applied from the inverter unit; a current sensing unit sensing a current flowing between the motor and the inverter unit; and a control unit integrating the current from the current sensing unit, operating an attenuation voltage by multiplying the integrated value by a constant (1/Cr), generating a control signal for producing an AC voltage corresponding to a difference between the set voltage and the attenuation voltage, and applying the control signal to the inverter unit.

Advantageous Effects

According to the present invention, even if the capacitor connected to the motor of the linear compressor is removed, the cooling capacity modulation can be controlled, which is advantageous in space and cost of the compressor.

Additionally, according to the present invention, it is possible to realize easy and fast modulation by controlling the natural cooling capacity modulation rate according to the load capacity.

Moreover, according to the present invention, it is possible to prevent the stroke jump phenomenon during the control operation of the linear compressor.

MODE FOR INVENTION

Hereinafter, exemplary embodiments of the present invention will be described in detail with reference to the attached drawings.

Figure 1:
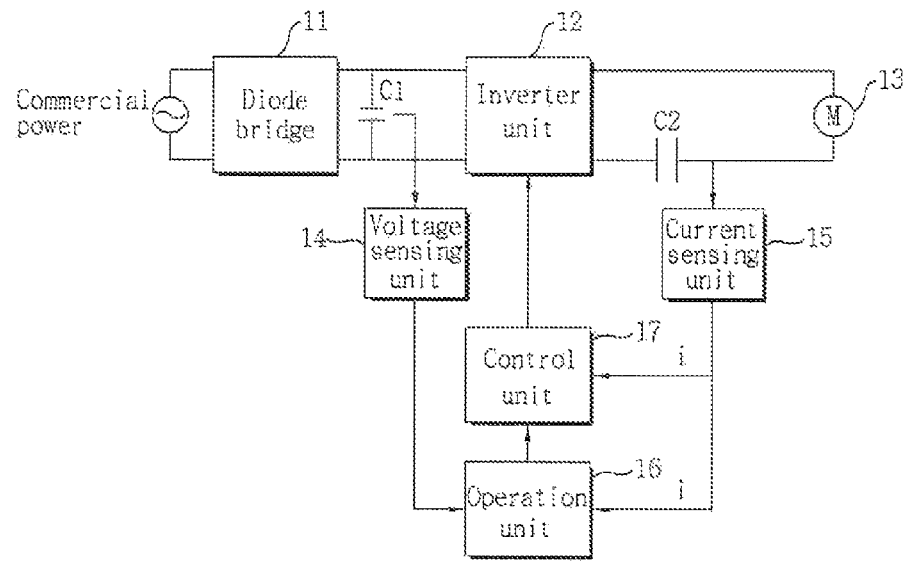
FIG. 1 is a block diagram of a motor control device used in a conventional linear compressor.
Figure 2:
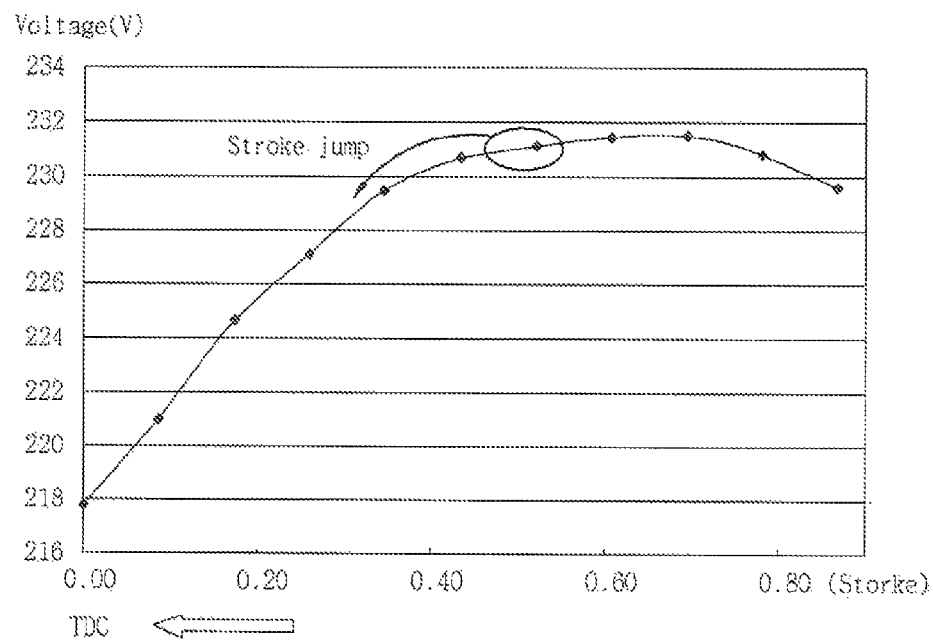
FIG. 2 is a graph showing changes of a stroke and an input voltage of the motor of FIG. 1.
Figure 3:
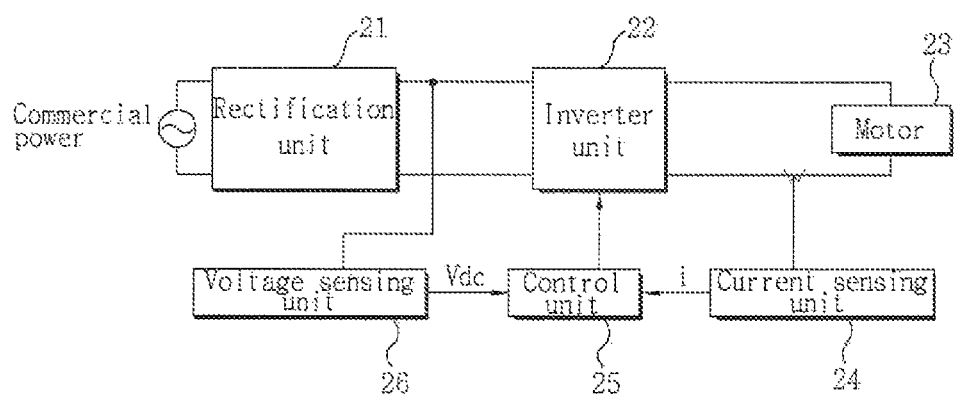
FIG. 3 is a block diagram of the control structure of a linear compressor according to the present invention.
Figure 4:
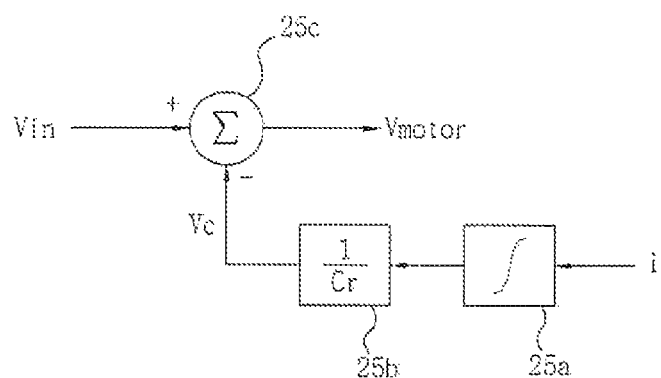
FIG. 4 is a circuit view of a control example of a control unit of FIG. 3.

FIG. 3 is a block diagram of the control structure of a linear compressor according to the present invention and FIG. 4 is a circuit view of a control example of a control unit of FIG. 3.

As illustrated in FIG. 3, the control structure of the linear compressor includes a rectification unit 21 receiving, rectifying, smoothing, and outputting AC power which is commercial power, an inverter unit 22 receiving a DC voltage, converting the DC voltage to an AC voltage according to a control signal from a control unit 25, and supplying the AC voltage to a motor 23, the motor 23 including a coil L, a current sensing unit 24 sensing a current flowing between the motor 23 and the inverter unit 22 or a current flowing through the coil L in the motor 23, a control unit 25 operating a motor application voltage Vmotor to be applied to the motor 23, based on the current sensed by the current sensing unit 24, generating a corresponding control signal, and applying the control signal to the inverter unit 22, and a voltage sensing unit 26 sensing the magnitude of the DC voltage from the rectification unit 21. However, in this control structure, the structure for supplying a required voltage to the control unit 25, the current sensing unit 24, the voltage sensing unit 26, etc. is obvious to a person of the ordinary skill in the art to which the present invention pertains, and thus a description thereof will be omitted.

The rectification unit 21 is composed of a diode bridge performing a general rectification function, a capacitor smoothing the rectified voltage, and so on.

The inverter unit 22, which is a means for receiving a DC voltage, generating an AC voltage, and applying the AC voltage to the motor 23, includes an IGBT element which is a switching element, a gate control unit turning on/off the IGBT element according to a control signal from the control unit 25, and so on. The inverter unit 22 is easily recognized by a person of the ordinary skill in the art to which the present invention pertains, and thus a description thereof will be omitted.

The motor 23 includes the coil L like a general motor of other mechanical structures but does not include a capacitor unlike the prior art.

The current sensing unit 24 is an element for sensing a current flowing through a conductive line between the inverter unit 22 and the motor 23 or a current flowing in the coil L of the motor 23.

The voltage sensing unit 26 is an element for sensing a DC voltage output from the rectification unit 21.

Here, the voltage sensing unit 26 can sense the entire DC voltage or a DC voltage reduced at a given ratio.

The control unit 25 generates a control signal for applying a preset application voltage Vin to the motor 23 and applies the control signal to the inverter unit 22, if it receives a linear compressor starting command from the outside or receives AC commercial power. As a result, the inverter unit 22 generates an AC voltage corresponding to the application voltage Vin and applies the AC voltage to the motor 23.

Due to the application of this AC voltage, the current sensing unit 24 senses a current i flowing from the inverter unit 22 to the motor 23 or a current i flowing through the coil L of the motor 23.

The control unit 25 receives the current i from the current sensing unit 24 and performs the processing shown in FIG. 4.

The control unit 25 includes an integrator 25a integrating the current i from the current sensing unit 24, an attenuator 25b operating an attenuation voltage Vc by multiplying the integrated value by a constant 1/Cr, and an operation unit 25c operating a difference between the set application voltage Vin and the attenuation voltage Vc. The application voltage Vin of this embodiment, which corresponds to the voltage applied by the inverter unit in the conventional compressor, is fixed or varied according to the control algorithm of the linear compressor.

The integrator 25a and the attenuator 25b correspond to the attenuation operation unit which attenuates the inductance effect of the coil L of the motor, using the current i flowing through the motor 23. That is, in this embodiment, since there is no capacitor connected to the coil L of the motor 23, the inductance effect of the coil L is reduced by controlling the motor application voltage Vmotor applied to the motor 23.

In addition, the constant 1/Cr used in the attenuator 25b may be fixedly or variably set according to the size of the coil L of the motor 23. For example, when an LC resonance frequency is set to be equal to a mechanical resonance frequency of the compressor, the constant 1/Cr may be determined accordingly. Or, if the LC resonance frequency is set to be higher or lower than the mechanical resonance frequency of the compressor, the constant 1/Cr may be determined accordingly.

As such, after the motor application voltage Vmotor is operated, the control unit 25 generates a control signal for allowing the inverter unit 22 to apply the operated motor application voltage Vmotor to the motor 23 and applies the control signal to the inverter unit 22. That is, the control unit 25 allows the sensed current i to be fed back to the motor application voltage Vmotor, so that the operation of the motor 23 can be controlled in a state where the capacitor is not connected to the motor 23. In the present invention, since the counter electromotive force (EMF) is reflected to the current i and fed back, it needs not to be considered separately. Thereafter, the control unit 25 repeatedly calculates and applies the motor application voltage Vmotor according to a difference between the application voltage Vin which is an initial voltage and an attenuation voltage which is obtained by integrating the current produced by the applied motor application voltage Vmotor (e.g., a first attenuation voltage by the application voltage Vin, a second attenuation voltage by the primarily calculated motor application voltage Vmotor, etc.).

The higher the load, the greater the motor application voltage Vmotor which is the required voltage. In the present invention, if the motor application voltage Vmotor (i.e., the maximum value) which is the required voltage is smaller than the DC voltage Vdc, a low load or a mid load is determined. In the case of the low load or the mid load, the inverter unit 22 applies an AC voltage (motor application voltage Vmotor) having a magnitude equal to or smaller than the DC voltage Vdc to the motor 23. Hence, the control unit 25 can maintain the required cooling capacity by controlling the magnitude of the AC voltage applied from the inverter unit 22 to the motor 23.

Further, the control unit 25 can attain a required high cooling capacity by changing the frequency of the motor application voltage Vmotor from the inverter unit 22, e.g., by increasing the frequency at a high load.

Figure 5:
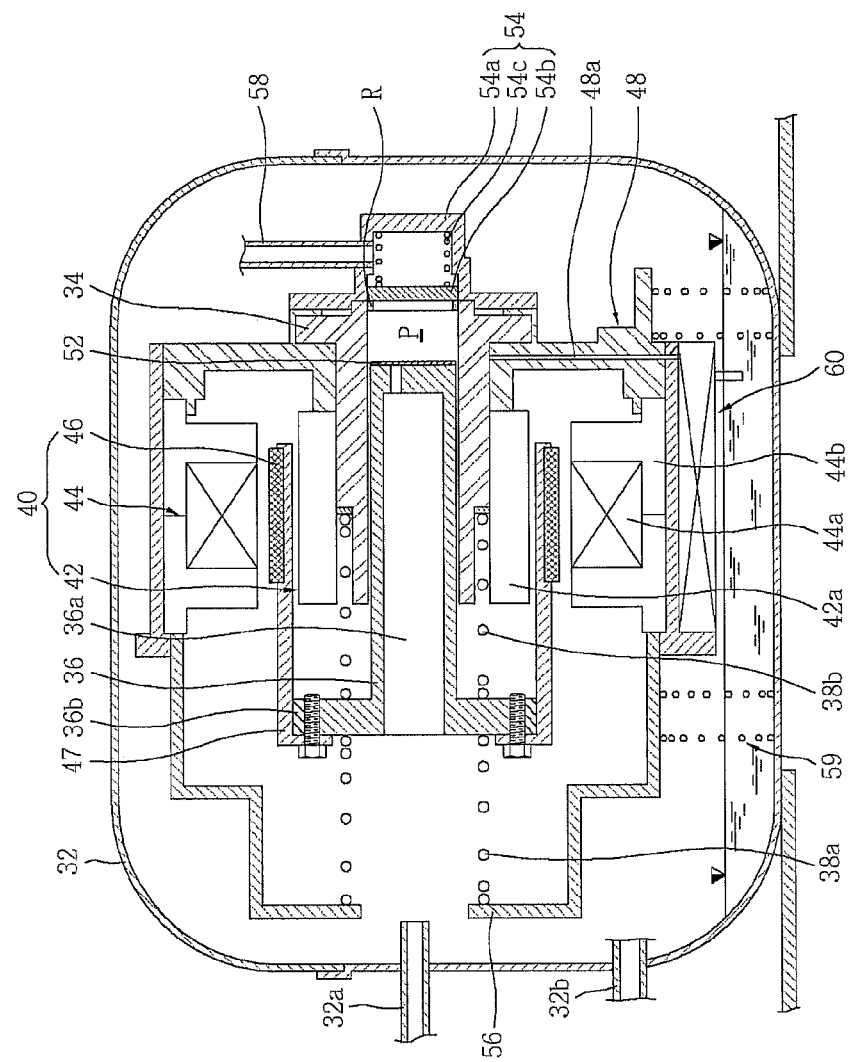
FIG. 5 is a structure view of the linear compressor according to the present invention.

FIG. 5 is a structure view of the linear compressor according to the present invention. As illustrated in FIG. 5, in the linear compressor according to the present invention, an inlet pipe 32a and an outlet pipe 32b through which a refrigerant flows in and out are provided at one side of a hermetic container 32, a cylinder 34 is fixedly installed in the hermetic container 32, a piston 36 is provided to be linearly reciprocated in the cylinder 34 to be able to compress the refrigerant sucked into a compression space P in the cylinder 34, and various springs are provided to elastically support the piston 36 in the motion direction of the piston 36. The piston 36 is provided to be connected to a linear motor 40 which produces a linear reciprocation driving force. Although a natural frequency fn of the piston 36 is changed according to a load, the linear motor 40 induces a natural output change which modulates the cooling capacity (output) according to the changed load.

Moreover, a suction valve 52 is provided at one end of the piston 36 which is in contact with the compression space P and a discharge valve assembly 54 is provided at one end of the cylinder 34 which is in contact with the compression space P. The suction valve 52 and the discharge valve assembly 54 are automatically opened and closed according to the pressure inside the compression space P, respectively.

Here, the hermetic container 32 has its upper and lower shells coupled to each other to seal up the inside, the inlet pipe 32a for introducing the refrigerant and the outlet pipe 32b for discharging the refrigerant are provided at one side of the hermetic container 32, the piston 36 is elastically supported in the motion direction to be linearly reciprocated in the cylinder 34, and the linear motor 40 is coupled to the outside of the cylinder 34 by a frame 48 to constitute an assembly. This assembly is provided on the inside bottom surface of the hermetic container 32 to be elastically supported by supporting springs 59.

Further, given oil is filled in the inside bottom surface of the hermetic container 32, an oil supply apparatus 60 pumping the oil is provided at a bottom end of the assembly, and an oil supply pipe 48a is provided in the frame 48 on the lower side of the assembly to be able to supply the oil between the piston 36 and the cylinder 34. Therefore, the oil supply apparatus 60 pumps out the oil due to the vibration caused by linear reciprocation of the piston 36, so that the oil is supplied to a gap between the piston 36 and the cylinder 34 along the oil supply pipe 48a and performs cooling and lubricating functions.

Next, it is preferable that the cylinder 34 should be formed in a hollow shape so that the piston 36 can be linearly reciprocated in the cylinder 34, have the compression space P at its one side, and be disposed in alignment with the inlet pipe 32a when its one end is positioned closely to the inside of the inlet pipe 32a.

Of course, the piston 36 is provided at one end of the cylinder 34 close to the inlet pipe 32a to be linearly reciprocated in the cylinder 34, and the discharge valve assembly 54 is provided at the other end of the cylinder 34 opposite to the inlet pipe 32a.

Here, the discharge valve assembly 54 includes a discharge cover 54a provided to define a given discharge space at a one-end side of the cylinder 34, a discharge valve 54b provided to open and close one end of the cylinder 34 near the compression space P, and a valve spring 54c which is a kind of coil spring applying an elastic force between the discharge cover 54a and the discharge valve 54b in the axial direction. An O-ring R is fitted into the inner circumference of one end of the cylinder 34 so that the discharge valve 54a can be closely attached to the one end of the cylinder 34.

Moreover, a bent loop pipe 58 is connected between one side of the discharge cover 54a and the outlet pipe 32b. The loop pipe 58 not only guides the compressed refrigerant to be discharged to the outside, but also prevents vibration produced by interactions between the cylinder 34, the piston 36 and the linear motor 40 from being transferred to the entire hermetic container 32.

Accordingly, as the piston 36 is linearly reciprocated in the cylinder 34, if the pressure inside the compression space P exceeds a given discharge pressure, the valve spring 54c is compressed to open the discharge valve 54b, so that the refrigerant is completely discharged from the compression space P to the outside along the loop pipe 58 and the outlet pipe 32b.

Next, a refrigerant passage 36a is defined in the center of the piston 36 so that the refrigerant introduced from the inlet pipe 32a can flow therethrough, the linear motor 40 is connected directly to one end of the piston 36 close to the inlet pipe 32a by a connection member 47, and the suction valve 52 is provided at the other end of the piston 36 opposite to the inlet pipe 32a. The piston 36 is elastically supported in its motion direction by various springs.

Here, the suction valve 52 is formed in a thin plate shape with its central portion partially cut away to open and close the refrigerant passage 36a of the piston 36 and with its one side fixed to one end of the piston 36 by screws.

Therefore, as the piston 36 is linearly reciprocated in the cylinder 34, if the pressure of the compression space P becomes equal to or lower than a given suction pressure which is lower than a discharge pressure, the suction valve 52 is open, so that the refrigerant is sucked into the compression space P, and if the pressure of the compression space P exceeds the given suction pressure, the refrigerant is compressed in the compression space P with the suction valve 52 closed.

Particularly, the piston 36 is elastically supported in its motion direction. Specifically, a piston flange 36b protruding in the radial direction from one end of the piston 36 close to the inlet pipe 32a is elastically supported in the motion direction of the piston 36 by mechanical springs 38a and 38b such as coil springs, and the refrigerant contained in the compression space P on the opposite side to the inlet pipe 32a operates as a gas spring due to its own elastic force, thereby elastically supporting the piston 36.

Here, the mechanical springs 38a and 38b have a constant mechanical spring constant Km regardless of the load. It is preferable that the mechanical springs 38a and 38b should be provided respectively on the cylinder 34 and a given supporting frame 56 fixed to the linear motor 40 side by side in the axial direction, based on the piston flange 36b. It is preferable that the mechanical spring 38a supported on the supporting frame 56 and the mechanical spring 38b provided on the cylinder 34 should have the same mechanical spring constant Km.

However, the gas spring has a gas spring constant Kg changed according to the load. As the ambient temperature rises, the pressure of the refrigerant increases, and thus a own elastic force of the gas contained in the compression space P increases. Therefore, the higher the load, the larger the gas spring constant Kg of the gas spring.

Here, while the mechanical spring constant Km is constant, the gas spring constant Kg is changed according to the load. As a result, the entire spring constant is changed according to the load, and the natural frequency fn of the piston 36 is also changed according to the gas spring constant Kg.

Accordingly, even if the load is changed, the mechanical spring constant Km and the mass M of the piston 36 are constant, but the gas spring constant Kg is changed, so that the natural frequency fn of the piston 36 is significantly influenced by the gas spring constant Kg depending upon the load.

Of course, the load can be measured in various ways. However, since the linear compressor includes a freezing/air conditioning cycle for compressing, condensing, evaporating and expanding the refrigerant, the load can be defined as a difference between a condensation pressure at which the refrigerant is condensed and an evaporation pressure at which the refrigerant is evaporated, and further is determined in consideration of an average pressure which is an average of the condensation pressure and the evaporation pressure so as to improve the accuracy.

That is, the load is calculated to be proportional to the difference between the condensation pressure and the evaporation pressure and the average pressure thereof. The higher the load, the larger the gas spring constant Kg. For example, the larger the difference between the condensation pressure and the evaporation pressure, the higher the load. Although the difference between the condensation pressure and the evaporation pressure is the same, the higher the average pressure, the higher the load. The gas spring constant Kg is calculated so that it can be increased according to such a load. The linear compressor may include a sensor (pressure sensor, temperature sensor, etc.) to calculate the load.

Here, a condensation temperature substantially proportional to the condensation pressure and an evaporation temperature substantially proportional to the evaporation pressure are measured, and then the load is calculated to be proportional to a difference between the condensation temperature and the evaporation temperature and an average temperature thereof.

Specifically, the mechanical spring constant Km and the gas spring constant Kg can be determined by means of various experiments. If the ratio of the gas spring constant Kg to the entire spring constant increases, a resonance frequency of the piston 36 can be changed in a relatively wide range according to the load.

The linear motor 40 includes an inner stator 42 configured in a manner that a plurality of laminations 42a are stacked in the circumferential direction and fixed to the outside of the cylinder 34 by the frame 48, an outer stator 44 configured in a manner that a plurality of laminations 44b are stacked in the circumferential direction around a coil winding body 44a wound with a coil and provided outside the cylinder 34 by the frame 48 with a given gap from the inner stator 42, and a permanent magnet 46 positioned in the gap between the inner stator 42 and the outer stator 44 and connected to the piston 36 by the connection member 47. The coil winding body 44a may be fixed to the outside of the inner stator 42.

The linear motor 40 is one embodiment of the motor 23 described above.

Figure 6:
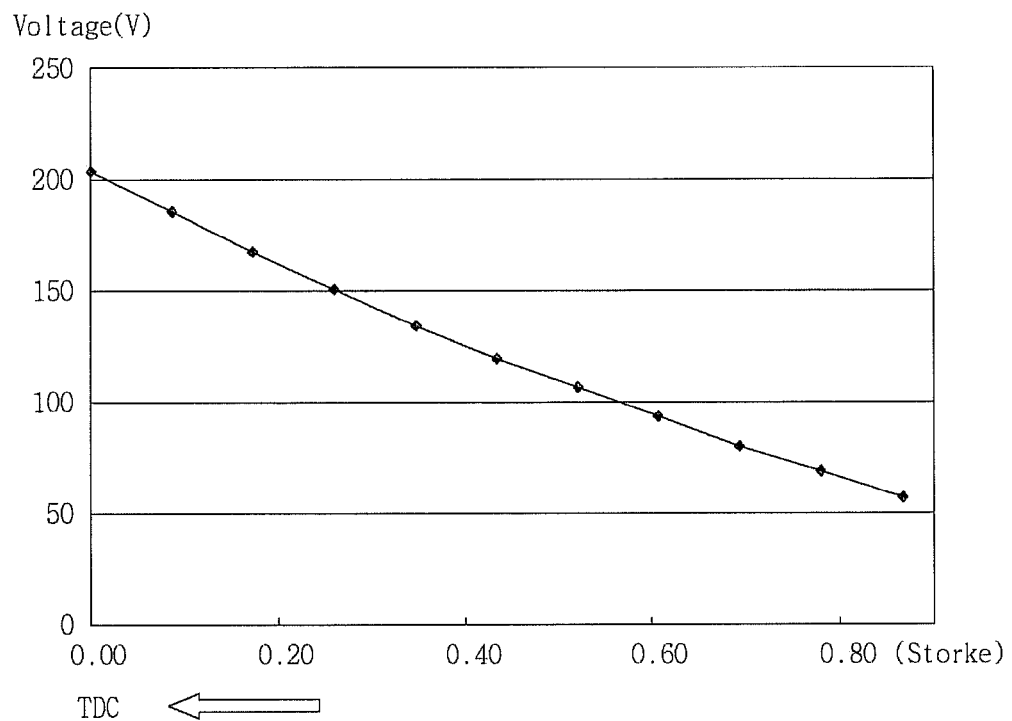
FIG. 6 is a graph showing changes of a stroke and an input voltage of a motor in the linear compressor according to the present invention.

FIG. 6 is a graph showing changes of a stroke and an input voltage of the motor in the linear compressor according to the present invention.

As illustrated in FIG. 6, in the linear compressor according to the present invention, even if the piston 36 approaches the top dead center, the input voltage of the motor rises, and thus the stroke jump phenomenon does not occur. Therefore, the linear compressor according to the present invention can perform the cooling capacity modulation in a stable state. That is, the control unit 25 can perform the natural cooling capacity modulation by the reciprocation of the piston 36 according to the load, by controlling the AC voltage applied to the motor 23 so that the stroke of the piston 36 can be proportional to the magnitude of the AC voltage applied to the motor 23.

In particular, the stroke of the piston 36 is proportional to the magnitude of the AC voltage applied to the motor 23 at least in close proximity to the top dead center of the piston 36, thereby preventing the stroke jump phenomenon.

Figure 7:
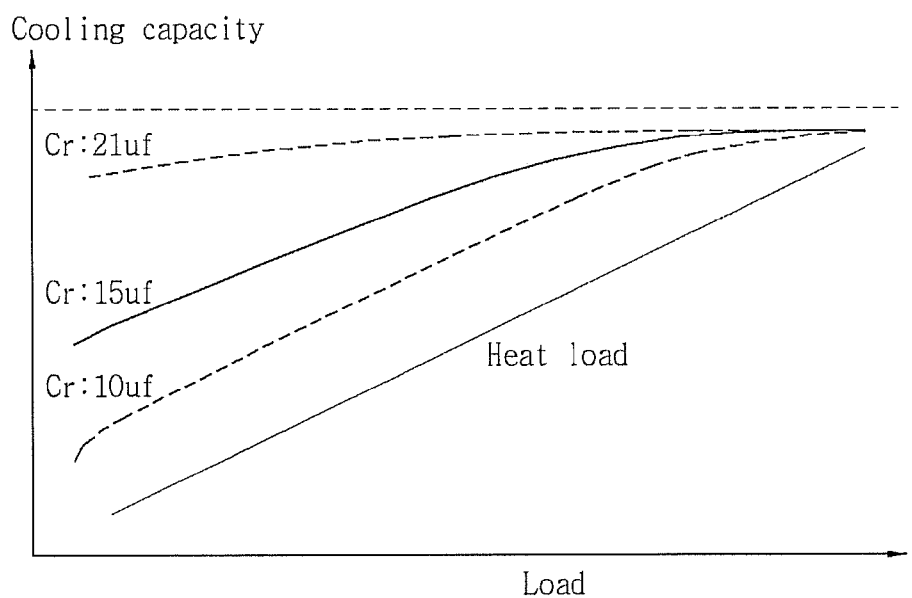
FIG. 7 is a graph showing changes of a cooling capacity and a load in the linear compressor according to the present invention.

FIG. 7 is a graph showing changes of the cooling capacity and the load in the linear compressor according to the present invention.

The control unit 25 stores a variable constant 1/Cr. Referring to FIG. 7, in the case of Cr(10 μF), it can be seen that the cooling capacity of the linear compressor is changed according to the load.

As the value of Cr or 1/Cr varies, the cooling capacity modulation rate is changed as shown in FIG. 7.

Accordingly, the control unit 25 according to the present invention can control the cooling capacity modulation rate by changing the constant 1/Cr or Cr.

As Cr varies, a phase difference between the motor application voltage Vmotor and the current i decreases at a low load, so that a higher cooling capacity can be accomplished at the same load. That is, the LC resonance frequency is determined by the value of Cr, and the phases of the motor application voltage Vmotor and the current i are determined at a certain load. Here, if Cr varies, the phases of the motor application voltage Vmotor and the current i are changed, and thus the entire power is changed. In other words, the cooling capacity increases or decreases, so that the natural cooling capacity modulation rate is changed.

Figure 8:
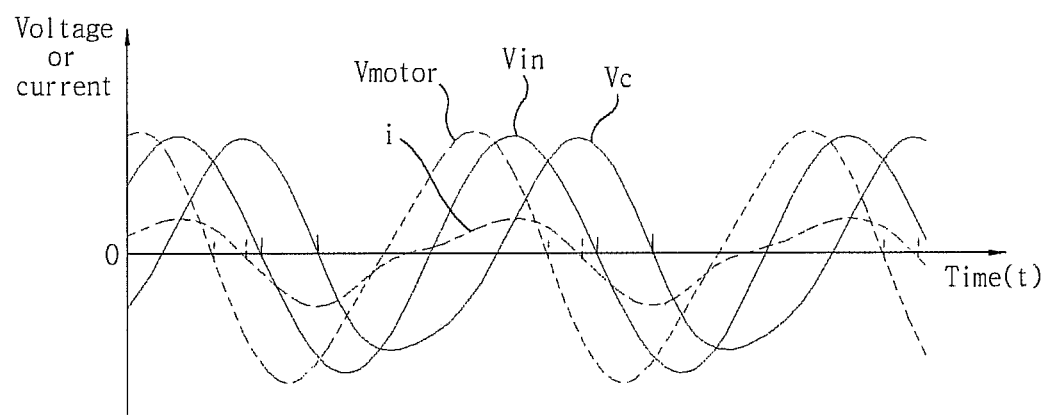
FIG. 8 is a graph showing voltages of the linear compressor according to the present invention.

FIG. 8 is a graph showing voltages of the linear compressor according to the present invention. As shown, the actual motor application voltage Vmotor is operated by subtracting the attenuation voltage Vc operated from the current i from the application voltage Vin. The motor application voltage Vmotor becomes equal to a voltage applied to a motor in a circuit in which a plurality of capacitors are connected in series to a coil L. As a result, the linear compressor can control the cooling capacity modulation.

The present invention has been described in detail with reference to the exemplary embodiments and the attached drawings. However, the scope of the present invention is not limited to such embodiments and drawings, but is defined by the appended claims.

The invention claimed is:

1. A linear compressor, comprising:
a fixed member having a compression space therein;
a movable member linearly reciprocated in the fixed member to compress a refrigerant sucked into the compression space;
one or more springs provided to elastically support the movable member in a motion direction of the movable member;
a motor connected to the movable member to linearly reciprocate the movable member in an axial direction; and
a motor controller that performs a cooling capacity modulation by the reciprocation of the movable member according to a load, by controlling an AC voltage applied to the motor so that a stroke of the movable member is proportional to a magnitude of the AC voltage applied to the motor, wherein the motor controller comprises a rectifier that receives AC power and outputs a DC voltage, an inverter that receives the DC voltage, converts the DC voltage to the AC voltage according to a control signal, and supplies the AC voltage to the motor, a current sensor that senses a current flowing between the motor and the inverter, and a control unit that integrates the current sensed by the current sensor, calculates an attenuation voltage by multiplying the integrated current by 1/Cr, generates a new control signal to produce a new AC voltage corresponding to a difference between the AC voltage and the attenuation voltage, and applies the new control signal to the inverter, wherein Cr is a capacitance.

2. The linear compressor of claim 1, wherein the motor controller comprises an attenuation operation device that attenuates an inductance effect of a coil of the motor using the current sensed by the current sensor.

3. The linear compressor of claim 2, wherein the motor controller varies 1/Cr such that phases of the AC voltage and the current sensed by the current sensor are changed.

4. The linear compressor of claim 3, wherein a cooling capacity modulation rate of the compressor is changed by variations of the AC voltage and 1/Cr.

5. The linear compressor of claim 1, wherein the AC voltage and 1/Cr are variable.

6. The linear compressor of claim 1, wherein a cooling capacity modulation rate of the compressor is changed by variations of the AC voltage and 1/Cr.

7. The linear compressor of claim 1, wherein the motor controller varies 1/Cr such that phases of the AC voltage and the current sensed by the current sensor are changed.

8. A method for controlling a linear compressor that includes a fixed member having a compression space therein, a movable member provided in the fixed member to compress a refrigerant sucked into the compression space, one or more springs provided to elastically support the movable member, and a motor connected to the movable member to linearly reciprocate the movable member in an axial direction, the method comprising:
applying predetermined initial voltage to the motor;
calculating a first attenuation voltage with a current produced by the application of the predetermined initial voltage;
calculating a first required voltage corresponding to a difference between the predetermined initial voltage and the first attenuation voltage;
applying the calculated first required voltage to the motor;
calculating a second attenuation voltage with a current produced by application of the calculated first required voltage;
calculating a second required voltage corresponding to a difference between the predetermined initial voltage and the second attenuation voltage; and
applying the second required voltage to the motor, wherein the calculating of the first required voltage and the calculating of the second required voltage, respectively, comprises integrating a respective current and calculating the first attenuation voltage and the second attenuation voltage by multiplying the integrated respective current by 1/Cr, wherein Cr is a capacitance.

9. The method of claim 8, wherein the calculating of the second attenuation voltage with the current produced by application of the calculated first required voltage the calculating of the second required voltage corresponding to the difference between the predetermined initial voltage and the second attenuation voltage, and the applying of the second required voltage to the motor is repeatedly performed.

10. The method of claim 8, wherein 1/Cr is variable.

11. A motor control device of a linear compressor, comprising:

a rectifier that receives AC power and outputs a DC voltage;

an inverter that receives the DC voltage, converts the DC voltage to an AC voltage according to a control signal, and supplies the AC voltage to a motor, the motor driven by the AC voltage applied from the inverter;

a current sensor that senses a current flowing between the motor and the inverter; and a controller that integrates the current sensed by the current sensor, calculates an attenuation voltage by multiplying the integrated current by 1/Cr, generates a new control to produce a new AC voltage corresponding to a difference between the AC voltage and the attenuation voltage, and applies the new control signal to the inverter, wherein Cr is a capacitance.

12. The motor control device of claim 11, wherein the AC voltage and 1/Cr are variable.

13. The motor control device of claim 11, wherein a cooling capacity modulation rate of the compressor is changed by variations of the AC voltage and 1/Cr.

* * * * *